Figure 1:
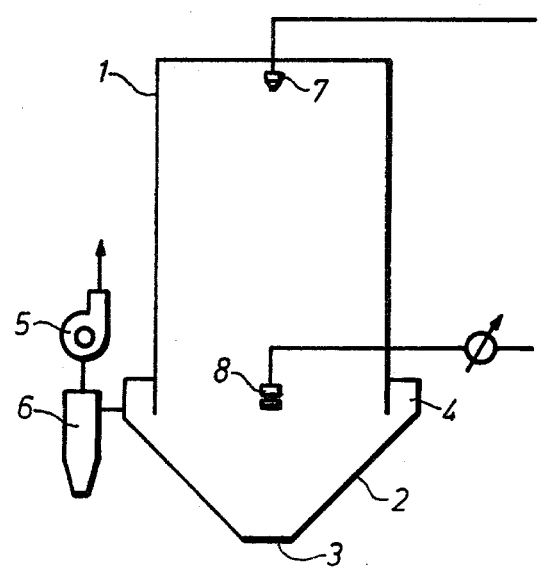

United States Patent [19]

Kaspar et al.

[11] 4,198,264
[45] Apr. 15, 1980

[54] PROCESS AND APPARATUS FOR SPRAY DRYING OR SPRAY COOLING

[75] Inventors: Vaclav Kaspar, Cologne; Hans-Heinz Mölls, Leverkusen; Reinhold Hörnle, Cologne; Ferdinand Hummes, Bergisch-Gladbach, all of Fed. Rep. of Germany

[73] Assignee: Bayer Aktiengesellschaft, Leverkusen, Fed. Rep. of Germany

[21] Appl. No.: 844,348

[22] Filed: Oct. 21, 1977

[30] Foreign Application Priority Data

Nov. 13, 1976 [DE] Fed. Rep. of Germany ....... 2651825

[51] Int. Cl.² .............................................. B01D 1/16
[52] U.S. Cl. .................................. 159/4 B; 159/4 D; 209/134

[58] Field of Search ............... 159/3, 4 R, 4 A, 4 B, 159/4 C, 4 CC, 4 D, 4 E, 4 G, 4 GC, 4 J, 4 MS, 4 K, 4 S, 4 ST, 4 SM, DIG. 25, 16 R, 165; 209/134, 135

[56] References Cited

U.S. PATENT DOCUMENTS

| | | | |
|---|---|---|---|
| 2,110,167 | 3/1938 | Northcutt et al. | 159/4 C |
| 2,703,139 | 5/1955 | Rappleyea | 159/4 D |
| 3,554,760 | 1/1971 | Sienkiewicz et al. | 159/4 B |
| 3,596,699 | 8/1971 | Okada et al. | 159/4 R |
| 3,828,837 | 8/1974 | Damgaard-Iversen et al. | 159/4 R |

*Primary Examiner*—Norman Yudkoff
*Attorney, Agent, or Firm*—Sprung, Felfe, Horn, Lynch & Kramer

[57] ABSTRACT

Sifting is improved by the installation of one or more nozzles in the longitudinal axis of a drier. A spray-dried granulate is thereby substantially freed from dust. The effect of heat on low melting products is reduced by cooling the gas.

7 Claims, 2 Drawing Figures

PROCESS AND APPARATUS FOR SPRAY DRYING OR SPRAY COOLING

This invention relates to a process for spray drying or spray cooling solutions or suspensions in spray driers having an annular channel which acts as a sifter.

To separate fine particles from coarse granulate, a cyclone separator is usually installed at the lower end of the conical part of a spray tower or in the conical part of the tower itself to effect dynamic separation of dust. One disadvantage of such an apparatus, which is quite large, is that the substances which are to be dried settle on the surfaces so that considerable cleaning has to be carried out and damage by heat is liable to occur. Moreover, the annular channel is only a moderately efficient sifter. Fine, floating particles which have already been dried are forced to undergo a change in direction of from 90°–180° while coarser particles and particles which are further removed from the sifting device (the annular channel or air funnel) do not follow this change in direction.

It is an object of this invention to provide an improved process for spray drying or spray cooling solutions or suspensions and an apparatus for carrying out the process with a view to producing a granulate which is, as far as possible, free from dust.

According to the invention, there is provided a process for spray drying or spray cooling a solution or suspension in a spray drier or cooler having an annular channel acting as a sifter, wherein a gas is caused to stream out in the direction of the drying wall from at least one nozzle arranged at or adjacent the longitudinal axis of the drier.

The invention also provides an apparatus for spray drying or spray cooling a solution or suspension, comprising a housing having a longitudinal axis, an atomisation device, an annular channel acting as a shifter, and at least one nozzle for emitting a gas stream arranged at or adjacent the said axis.

A substantially dust-free granulate can be obtained economically by the process according to the invention. The fine particles which are situated near the longitudinal axis of the spray tower and are therefore not within the range of the annular channel to enalbe them to be sifted are brought within reach of the annular channel by the gas streaming out of the nozzle.

Even low melting products may be spray dried by this process since damage by heat can be avoided by using a cooled gas.

It is particularly advantageous that existing spray driers having an annular channel can easily be converted, simply by installing the nozzle. The apparatus can easily be adapted to the dimensions of the spray tower by suitable choice of gas pressure and of the drying element. The nozzle which is to be placed in the longitudinal axis of the drier is advantageously installed in the lower part of the drier. The angle at which the gas streams from the nozzle to the annular channel is preferably between 45° and 135° with respect to the longitudinal axis of the drier. A flat jet nozzle is advantageous for reasons of economy. It is in many cases suitable to inject compressed air, and for reasons of economy this is preferred.

An apparatus for carrying out the process is illustrated in the drawing and described in detail below. In the accompanying drawings, FIG. 1 is a section through a spray drier, and
FIG. 2 is a section through a nozzle.

The spray tower has a cylindrical upper part 1 and a tapered conical lower part 2. The cone is open at the bottom 3 for the discharge of a product. An annular channel 4 is provided for sifting in the lower end of the cylindrical part. A fan 5 removes the air by suction through a cyclone separator 6. A pressure nozzle 7 for spraying the product which is to be dried is situated in the upper part of the spray tower. As the moist material enters the drier, it comes into contact with hot air and rapidly dries to form a granulate. Product which is already dry floats downwards in the stream of drying air and enters the region of the nozzle 8 in the lower end of the cylindrical part. The granular particles are thereby caused to undergo a change in direction. Fine particles are brought within the range of action of the annular channel and removed there by suction, whereas coarse particles are only deflected to an insignificant extent and drop through the opening 3 into a packaging container.

Figure 2:
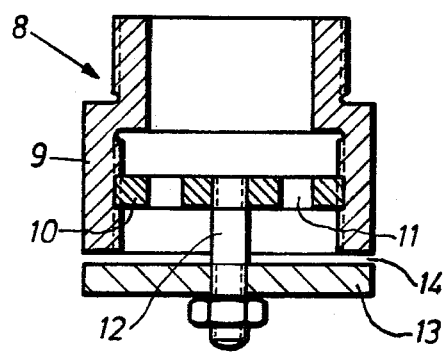

FIG. 2 shows a nozzle 8 which comprises a perforated disc 10 which is screwed into a housing 9. In the present case, the disc 10 has six apertures 11 each having a diameter of 6 mm. A cover 13 is fixed to the perforated disc 11 by a pin 12. The outlet gap 14 of the nozzle can be adjusted to between 0 and 5 mm by rotating the cover 13.

When the apparatus according to the invention is used for drying a 30% suspension of a dispersing agent (a condensation product of diphenylether sulphonic acid and formaldehyde), the proportion of fine particles (less than 50 $\mu$m) in the resulting granulate is 61% less than that found in a granulate produced in the same drier but without the separating nozzle. The drier used in this example is an IKW Atomisation Drier (evaporation of water 70 kg, total weight 15 m, internal diameter 1.5 m, diameter of annular channel 2.5 m).

What we claim is:

1. A process for spray drying or spray cooling a solution or suspension in a spray drier or cooler including a housing having a central longitudinal axis and an annular channel in the lower portion thereof acting as a sifter, comprising the steps of spraying the product to be dried or cooled and streaming out a gas outwardly in the direction of the housing annularly from at or adjacent the central longitudinal axis of the drier at substantially a right angle to the central longitudinal axis of the drier by at least one nozzle arranged at or adjacent the central longitudinal axis of the drier and below the sprayed out product to direct selected particles into the sifter.

2. A process according to claim 1, wherein the gas is a cooled gas.

3. A process according to claim 1, wherein the nozzle is arranged at the same level as the annular channel.

4. An apparatus for spray drying or spray cooling a solution or suspension comprising a housing having a central longitudinal axis, an atomisation device disposed in the housing for spraying out the product to be cooled or dried, a sifter comprising an annular channel in the lower portion of the housing, and at least one nozzle means arranged at or adjacent the central longitudinal axis and below the atomisation device for emitting a gas stream annularly outwardly towards the housing and at substantially a right angle to the central longitudinal axis to direct selected particles into the sifter.

5. An apparatus according to claim 4, wherein at least one of the nozzle means is installed at the same level as the annular channel.

6. An apparatus according to claim 4, wherein each nozzle means is adapted to emit a flat jet of gas.

7. An apparatus according to claim 4, wherein the gas is air.

* * * * *